(12) United States Patent
Liang

(10) Patent No.: US 11,503,798 B2
(45) Date of Patent: Nov. 22, 2022

(54) PET CAGE

(71) Applicant: Ruopeng Liang, Zhong Shan (CN)

(72) Inventor: Ruopeng Liang, Zhong Shan (CN)

(73) Assignee: Rupeng Liang, Zhong Shan (CN)

( * ) Notice: Subject to any disclaimer, the term of this patent is extended or adjusted under 35 U.S.C. 154(b) by 367 days.

(21) Appl. No.: 16/866,721

(22) Filed: May 5, 2020

(65) Prior Publication Data

US 2021/0289742 A1 Sep. 23, 2021

(30) Foreign Application Priority Data

Mar. 17, 2020 (CN) .......................... 202020336546.5

(51) Int. Cl.
*A01K 1/035* (2006.01)
*F16B 5/00* (2006.01)
*F16B 5/07* (2006.01)

(52) U.S. Cl.
CPC ............ *A01K 1/035* (2013.01); *F16B 5/0092* (2013.01); *F16B 5/07* (2013.01)

(58) Field of Classification Search
CPC .... A01K 1/035; A01K 1/0245; A01K 1/0236; A01K 1/034; A01K 1/033
See application file for complete search history.

(56) References Cited

U.S. PATENT DOCUMENTS

| | | | | |
|---|---|---|---|---|
| 1,129,011 A * | 2/1915 | Pyle | .......................... | B65D 7/20 |
| | | | | 100/910 |
| 1,431,745 A * | 10/1922 | Lang | .................... | A01K 31/002 |
| | | | | 220/6 |
| 3,556,058 A * | 1/1971 | Smiler | ..................... | A01K 1/03 |
| | | | | 119/474 |
| 4,762,085 A * | 8/1988 | Ondrasik | ............... | A01K 31/08 |
| | | | | 119/474 |
| 4,763,606 A * | 8/1988 | Ondrasik, II | ........ | A01K 1/0245 |
| | | | | 119/474 |
| 6,192,834 B1 * | 2/2001 | Kolozsvari | ............ | A01K 31/08 |
| | | | | 119/474 |
| 7,918,188 B1 * | 4/2011 | Harper | ................... | A01K 31/02 |
| | | | | 119/481 |

(Continued)

FOREIGN PATENT DOCUMENTS

| CN | 204796433 U | * 11/2015 | ........... A01K 1/0245 |
|---|---|---|---|
| CN | 106270312 A | * 1/2017 | ........... A01K 1/0245 |

(Continued)

*Primary Examiner* — Monica L Perry
*Assistant Examiner* — Aaron M Rodziwicz
(74) *Attorney, Agent, or Firm* — Oliff PLC

(57) ABSTRACT

The pet cage includes a base, a top net plate and a plurality of side net plates, wherein the side net plates are sequentially connected end to end to form a fence space, the bottom of the fence space is connected with the base, and the top of the fence space is connected with the top net plate; a connecting structures for connecting adjacent side net plates with each other are arranged between the adjacent side net plates, and the connecting structure includes a clamping hook arranged on one side net plate and a clamping tongue arranged on the other side net plate for clamping and locking the clamping hook. Therefore, the invention has the advantages of simple manufacturing process, quick and convenient installation, high connection strength, safety and reliability.

6 Claims, 5 Drawing Sheets

(56) References Cited

U.S. PATENT DOCUMENTS

| | | | |
|---|---|---|---|
| 9,399,889 B2 * | 7/2016 | Cantwell | A01K 1/033 |
| 10,378,255 B2 * | 8/2019 | McDaid | E05C 1/006 |
| 10,697,213 B2 * | 6/2020 | Cantwell | E05C 1/04 |
| 10,738,515 B2 * | 8/2020 | Cantwell | A01K 1/0058 |
| 10,743,514 B2 * | 8/2020 | Cantwell | E05C 19/006 |
| 10,842,126 B1 * | 11/2020 | Volin | A01K 1/0353 |
| 11,032,999 B2 * | 6/2021 | He | A01K 1/034 |
| 2005/0034679 A1 * | 2/2005 | Link | A01K 31/08 |
| | | | 119/474 |
| 2012/0186529 A1 * | 7/2012 | Cantwell | A01K 1/034 |
| | | | 119/474 |
| 2012/0186530 A1 * | 7/2012 | Cantwell | A01K 1/034 |
| | | | 119/474 |
| 2014/0109839 A1 * | 4/2014 | Cantwell | E06B 11/021 |
| | | | 49/394 |
| 2014/0216353 A1 * | 8/2014 | Cantwell | E06B 3/5081 |
| | | | 119/481 |
| 2014/0216354 A1 * | 8/2014 | Cantwell | A01K 1/0245 |
| | | | 49/394 |
| 2015/0282452 A1 * | 10/2015 | Cantwell | E05B 61/00 |
| | | | 292/103 |
| 2015/0305297 A1 * | 10/2015 | Link | A01K 1/034 |
| | | | 119/474 |
| 2017/0292298 A1 * | 10/2017 | Cantwell | A01K 1/034 |
| 2017/0292299 A1 * | 10/2017 | Cantwell | A01K 1/032 |
| 2019/0063122 A1 * | 2/2019 | McDaid | A01K 1/0035 |
| 2019/0075754 A1 * | 3/2019 | Koskey | A01K 1/035 |
| 2019/0274276 A1 * | 9/2019 | Cantwell | E05C 19/006 |
| 2021/0144954 A1 * | 5/2021 | Cantwell | F16B 7/0433 |
| 2021/0227784 A1 * | 7/2021 | Link | E05C 3/14 |

FOREIGN PATENT DOCUMENTS

| | | | | |
|---|---|---|---|---|
| EP | 2721923 A2 * | 4/2014 | | A01K 1/0017 |
| GB | 2238296 A * | 5/1991 | | A01K 1/0245 |
| GB | 2489199 A * | 9/2012 | | A01K 1/0245 |

\* cited by examiner

PET CAGE

TECHNICAL FIELD

The present invention relates to the field of pet supplies, in particular to a pet cage.

BACKGROUND ART

With the improvement of people's living standard, more and more people like to raise pets. Raising pets is a very meaningful thing, which not only can cultivate one's taste, but also can enrich people's sparetime life. Raising pets is beneficial to cultivating love. Interacting with the pets for a long time, we will be moved by the living creatures, close to nature and with emotions of love and care; it is helpful to sports, which not only makes people go out frequently, but also greatly reduces various psychological disorders caused by emotional loneliness; and also it is beneficial to mental health, and the pets are good listeners, as the pets cannot refute, and accompany people tirelessly. The pet cage can be used for raising pets, so that the pet cage has a market prospect.

At present, the pet cage structure on the market is generally formed by assembling and connecting. However, the existing assembling and connecting structure has the problems that the manufacturing process is difficult, the installation process is complex, the manufacturing cost is high, and the connecting strength of the structure is not high.

Therefore, the present invention is researched and put forward aiming at the problems.

SUMMARY OF THE PRESENT INVENTION

The purpose of the present invention is to provide a pet cage aiming at the defects of the prior art, and the pet cage has the advantages of simple manufacturing process, quick and convenient installation, high connection strength, safety and reliability.

Compared with the prior art, the pet cage of the present invention has the following advantages.

1. A pet cage is characterized by comprising a base, a top net plate and a plurality of side net plates, wherein the side net plates are sequentially connected end to end to form a fence space, the bottom of the fence space is connected with the base, and the top of the fence space is connected with the top net plate; a connecting structure for connecting adjacent side net plates with each other is arranged between the adjacent side net plates, and the connecting structure comprises a clamping hook arranged on one side net plate and a clamping tongue arranged on the other side net plate for clamping and locking the clamping hook. Therefore, the present invention has the advantages of simple manufacturing process, quick and convenient installation, high connection strength, safety and reliability.

2. The present invention has the advantages of increasing the strength of the pet cage and preventing the pet from breaking the cage when colliding.

3. In the present invention, two side net plates are bent via a whole metal wire to form buckle type connection, so that burrs formed by welding the two side net plates are reduced, and the burrs are prevented from scratching pets.

BRIEF DESCRIPTION OF THE DRAWINGS

Hereinafter, specific implementations of the present invention will be described in further detail with reference to the accompanying drawings, in which.

DETAILED DESCRIPTION OF THE PRESENT INVENTION

Figure 1:
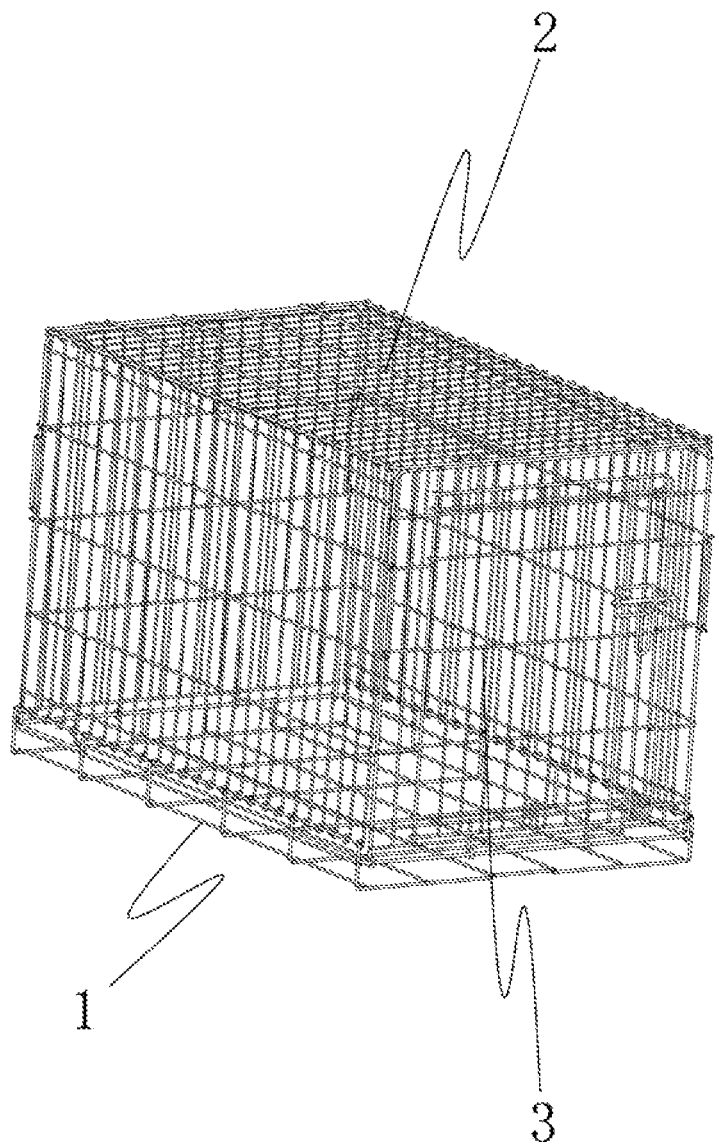
FIG. 1 is a front view of the present invention.

Hereinafter, implementations of the present invention will be described in detail with reference to FIGS. 1 to 5.

As shown in FIGS. 1 to 5, the pet cage comprises a base 1, a top net plate 2 and a plurality of side net plates 3, wherein the side net plates 3 are sequentially connected end to end to form a fence space, the bottom of the fence space is connected with the base 1, and the top of the fence space is connected with the top net plate 2; a connecting structures 4 for connecting adjacent side net plates 3 with each other are arranged between the adjacent side net plates 3, and the connecting structure 4 comprises a clamping hook 41 arranged on one side net plate 3 and a clamping tongue 42 arranged on the other side net plate 3 for clamping and locking the clamping hook 41. Therefore, the present invention has the advantages of simple manufacturing process, quick and convenient installation, high connection strength, safety and reliability.

The connecting structure 4 can also be used between the side net plate and the top net plate or between the side net plate and the base.

In order to further improve the connection stability, the hook 41 is bent inwards or outwards, and the corresponding clamping tongue 42 is bent outwards or inwards.

For improving the connection strength of the clamping hook 41 and the clamping tongue 42, and reducing the production cost and the assembly steps, the clamping hook 41 and the clamping tongue 42 are directly stamped and formed by metal wires of the side net plate 3 when the side net plate 3 during mold stripping.

According to design requirements, the clamping hook 41 and the clamping tongue 42 are connected with the side net plate 3 by electric welding.

Figure 2:
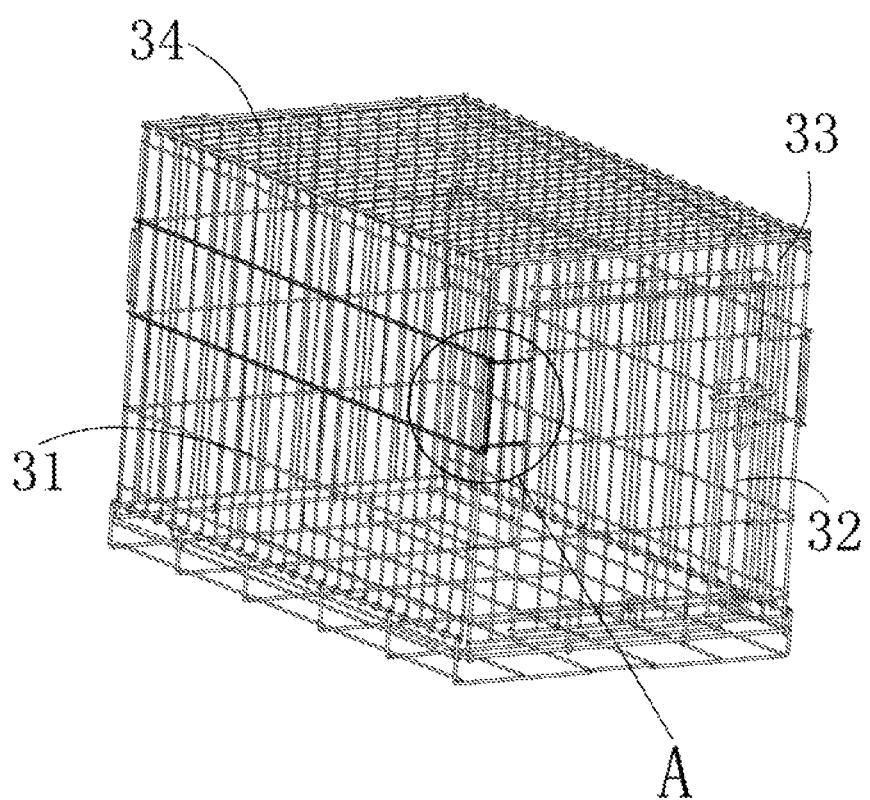
FIG. 2 is a schematic diagram of A of a first embodiment of the present invention.
Figure 4:
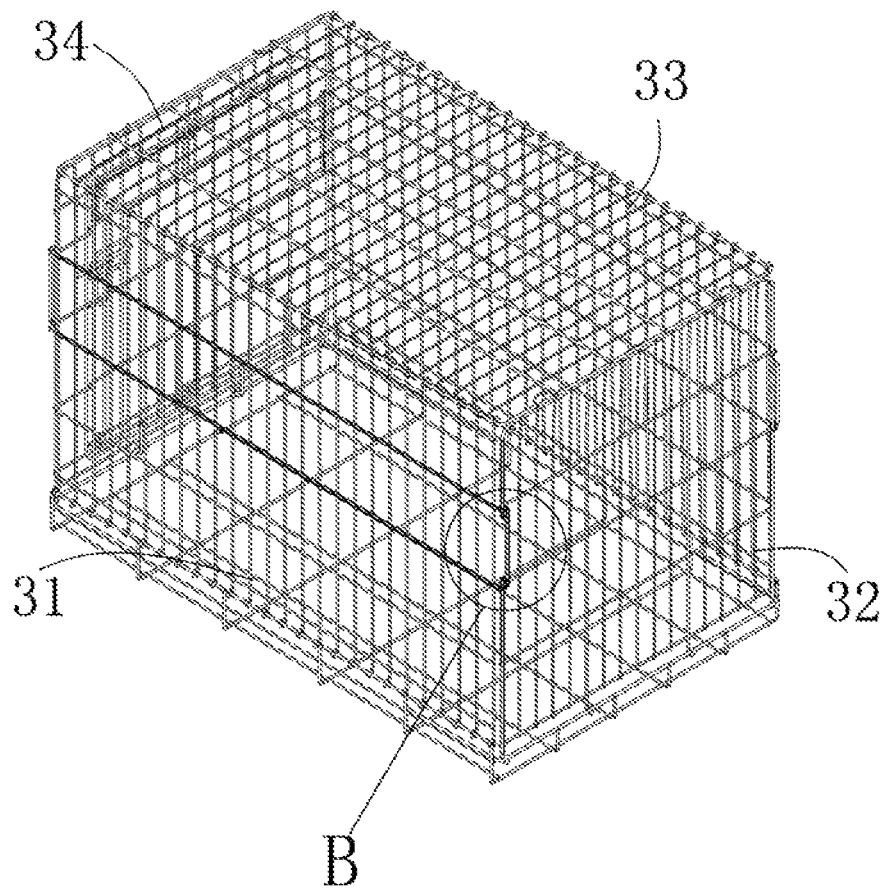
FIG. 4 is a schematic diagram of B of a second embodiment of the present invention.

As shown in FIG. 1, FIG. 2 and FIG. 4, the side net plate 3 comprises a first side net plate 31, a second side net plate 32, a third side net plate 33 and a fourth side net plate 34, the side edges of the first side net plate 31, the second side net plate 32, the third side net plate 33 and the fourth side net plate 34 are connected end to end, and the formed fence space is a cuboid. Pets can move in the fence space conveniently, and it is convenient for the pets to be transported or raised.

Figure 3:
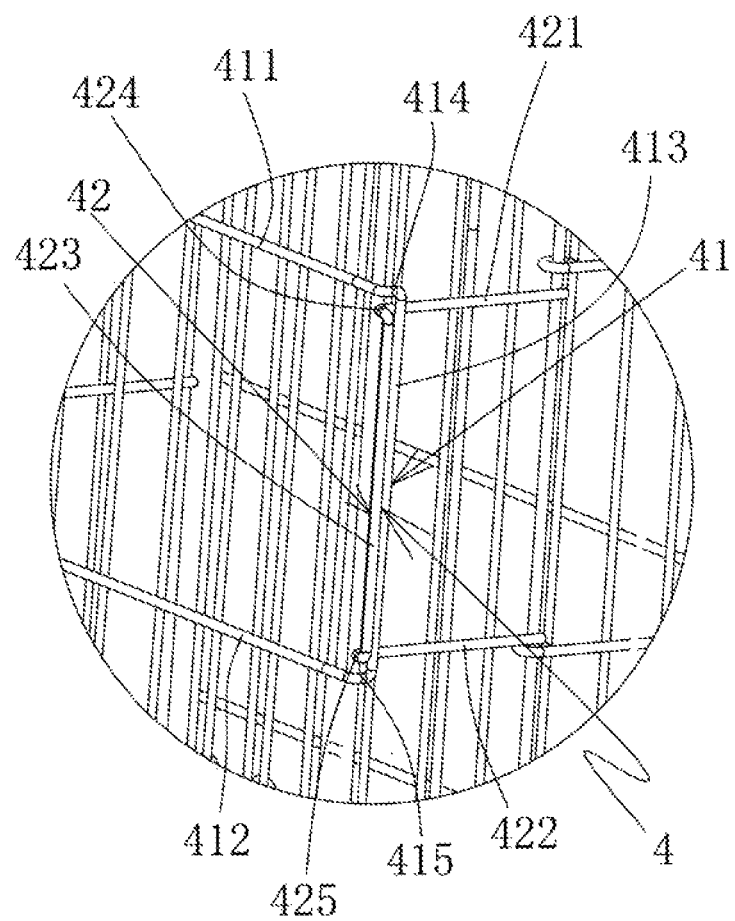
FIG. 3 is an enlarged schematic view of A in FIG. 2.

As shown in FIGS. 2 and 3, the clamping hook 41 comprises a first cross rod part 411 and a second cross rod part 412 which are transversely arranged on the first side net plate 31, a first vertical rod part 413 which is vertically arranged, a first bending part 414 connected to one ends of the first cross rod part 411 and the first vertical rod part 413, and a second bending part 415 connected to the other ends of the second cross rod part 412 and the first vertical rod part 413; the clamping tongue 42 comprises a third cross rod part 421 and a fourth cross rod part 422 arranged on the second side net plate 32, a second vertical rod part 423 which is vertically arranged, a third bending part 424 connected to one ends of the third cross rod part 421 and the second vertical rod part 423, a fourth bending part 425 connected to the other ends of the fourth cross rod part 422 and the second vertical rod part 423, wherein the first cross rod part 411 and the second cross rod part 412 are arranged in parallel; the first bending part 414 is perpendicular to the first cross rod portion 411; the second bending part 415 is perpendicular to the second cross rod portion 412; the first vertical rod portion 413 is perpendicular to the first bending part 414 and the second bending part 415, respectively; the third cross rod portion 421 and the fourth cross rod portion 422 are arranged in parallel; the third bending part 424 is perpendicular to the third cross rod portion 421; the fourth bending part 425 is perpendicular to the fourth cross rod portion 422; the second vertical rod part 423 is perpendicular to the third bending part 424 and the fourth bending part 425 respectively; the length of the second vertical rod part 423 is less than the length of the first vertical rod part 413; the clamping hook 41 and the clamping tongue 2 are mutually engaged to form a buckling structure, and the arrangement is convenient for rapid assembly and connection between two adjacent side net plates; the connecting structure has no end part of an iron wire, and burrs cannot be formed, so that burrs at the end part of the iron wire are prevented from injuring pets to achieve a good protection effect.

Figure 5:
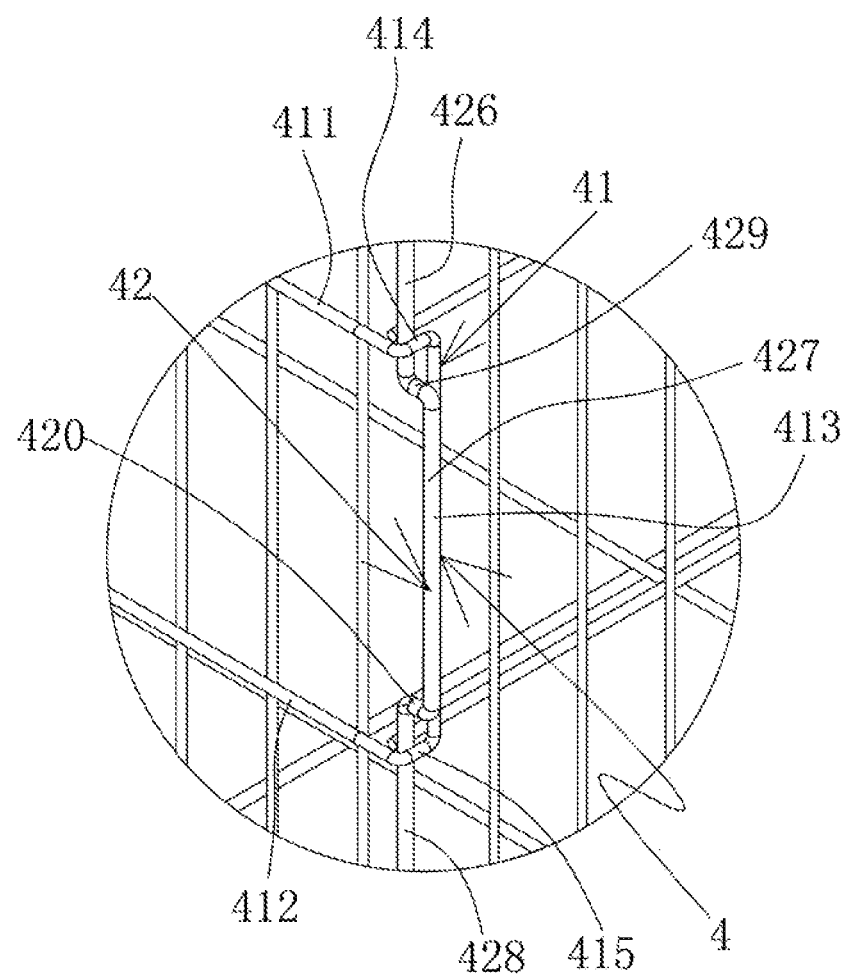
FIG. 5 is an enlarged schematic view of B in FIG. 4.

As shown in FIGS. 4 and 5, the clamping hook 41 comprises a first cross rod part 411 and a second cross rod part 412 which are transversely arranged on the first side net plate 31, a first vertical rod part 413 which is vertically arranged, a first bending part 414 connected to one ends of the first cross rod part 411 and the first vertical rod part 413, and a second bending part 415 connected to the other ends of the second cross rod part 412 and the first vertical rod part 413; the clamping tongue 42 comprises a third vertical rod part 426, a fourth vertical rod part 427 and a fifth vertical rod part 428 which are sequentially arranged on the second side net plate 32; wherein a lower end of the third vertical rod part 426 is connected with an upper end of the fourth vertical rod part 427 by a fifth bending part 429; an upper end of the fifth vertical rod part 428 is connected with a lower end of the fourth vertical rod part 427 by a sixth bending part 420; the length of the fourth vertical rod part 427 is less than the length of the first vertical rod part 413; the fourth vertical rod part 427, the fifth bending part 429 and the sixth bending part 420 form a protrusion clamped into the clamping hook 41; the clamping tongue 2 form a protrusion clamped into the clamping hooks 41 to form a buckling structure; the arrangement is convenient for rapid assembly and connection between two adjacent side net plates; and the connecting structure has no end part of an iron wire, and burrs cannot be formed, so that burrs at the end part of the iron wire are prevented from injuring pets to achieve a good protection effect.

The invention claimed is:

1. A pet cage, comprising a base, a top net plate and a plurality of side net plates, wherein:

the side net plates are sequentially connected end to end to form a fence space, a bottom of the fence space is connected with the base, and a top of the fence space is connected with the top net plate;

a connecting structure for connecting adjacent side net plates with each other is arranged between the adjacent side net plates, and the connecting structure comprises a clamping hook arranged on one of the side net plates and a clamping tongue arranged on another of the side net plates for clamping and locking the clamping hook;

each side net plate comprises a first side net plate, a second side net plate, a third side net plate and a fourth side net plate, wherein side edges of the first side net plate, the second side net plate, the third side net plate and the fourth side net plate are connected end to end, and the formed fence space is a cuboid;

the clamping hook comprises a first cross rod part and a second cross rod part which are transversely arranged on the first side net plate, a first vertical rod part which is vertically arranged, a first bending part connected to first ends of the first cross rod part and the first vertical rod part, and a second bending part connected to second ends of the second cross rod part and the first vertical rod part; and the clamping tongue comprises a third cross rod part and a fourth cross rod part which are arranged on the second side net plate, a second vertical rod part which is vertically arranged, a third bending part connected to first ends of the third cross rod part and the second vertical rod part, and a fourth bending part connected to second ends of the fourth cross rod part and the second vertical rod part.

2. The pet cage according to claim 1, wherein the clamping hook is bent inwards or outwards, and the corresponding clamping tongue is bent outwards or inwards.

3. The pet cage according to claim 1, wherein the clamping hook and the clamping tongue are directly stamped and formed by metal wires of the side net plate during mold stripping.

4. The pet cage according to claim 1, wherein the clamping hook and the clamping tongue are connected with the side net plate via electric welding.

5. The pet cage according to claim 1, wherein the first cross rod part and the second cross rod part are arranged in parallel; the first bending part is perpendicular to the first cross rod part; the second bending part is perpendicular to the second cross rod part; the first vertical rod part is perpendicular to the first bending part and the second bending part respectively; the third cross rod part and the fourth cross rod part are arranged in parallel; the third bending part is perpendicular to the third cross rod part; the fourth bending part is perpendicular to the fourth cross rod part; the second vertical rod part is perpendicular to the third bending part and the fourth bending part; and a length of the second vertical rod part is less than a length of the first vertical rod part.

6. A pet cage, comprising a base, a top net plate and a plurality of side net plates, wherein:

the side net plates are sequentially connected end to end to form a fence space, a bottom of the fence space is connected with the base, and a top of the fence space is connected with the top net plate;

a connecting structure for connecting adjacent side net plates with each other is arranged between the adjacent side net plates, and the connecting structure comprises a clamping hook arranged on one of the side net plates and a clamping tongue arranged on another of the side net plates for clamping and locking the clamping hook;

each side net plate comprises a first side net plate, a second side net plate, a third side net plate and a fourth side net plate, wherein side edges of the first side net plate, the second side net plate, the third side net plate and the fourth side net plate are connected end to end, and the formed fence space is a cuboid;

the clamping hook comprises a first cross rod part and a second cross rod part which are transversely arranged on the first side net plate, a first vertical rod part which is vertically arranged, a first bending part connected to first ends of the first cross rod part and the first vertical rod part, and a second bending part connected to second ends of the second cross rod part and the first vertical rod part;

the clamping tongue comprises a third vertical rod part, a fourth vertical rod part and a fifth vertical rod part which are sequentially arranged on the second side net plate;

a lower end of the third vertical rod part is connected with an upper end of the fourth vertical rod part by a fifth bending part; an upper end of the fifth vertical rod part is connected with a lower end of the fourth vertical rod part by a sixth bending part;

a length of the fourth vertical rod part is less than a length of the first vertical rod part; and the fourth vertical rod part, the fifth bending part and the sixth bending part form a protrusion clamped into the clamping hook.

\* \* \* \* \*